No. 768,228. PATENTED AUG. 23, 1904.
D. & F. HURST.
JOINT FOR TUBING OR PIPES.
APPLICATION FILED DEC. 15, 1903.
NO MODEL. 2 SHEETS—SHEET 1.

Witnesses.
Stephen Edward Gunyon
William Anderson Smith

Inventors.
Daniel Hurst
Frank Hurst

No. 768,228. PATENTED AUG. 23, 1904.
D. & F. HURST.
JOINT FOR TUBING OR PIPES.
APPLICATION FILED DEC. 15, 1903.
NO MODEL. 2 SHEETS—SHEET 2.
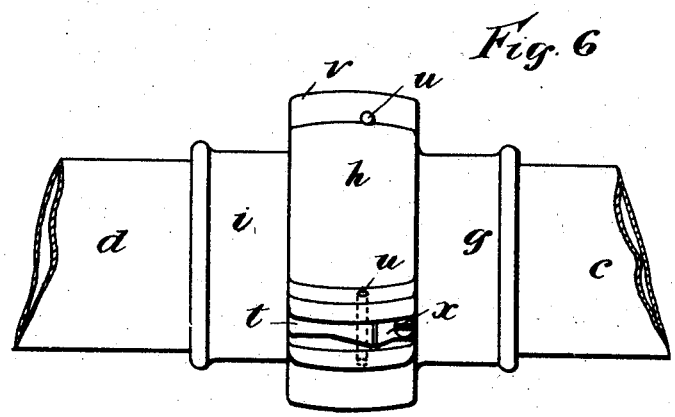
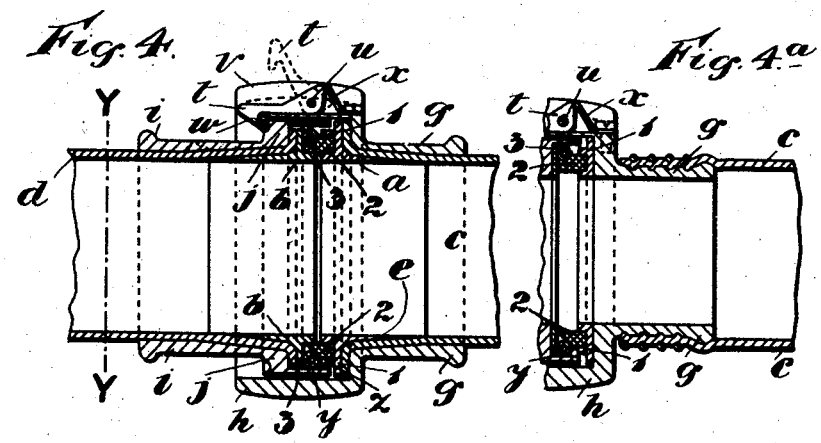
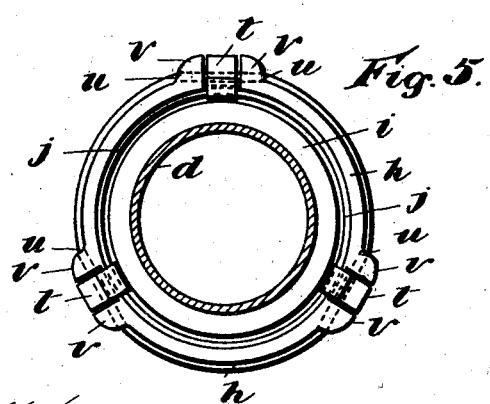
Witnesses
Stephen Edward Gunyon
William Anderson Smith
Inventors
Daniel Hurst
Frank Hurst No. 768,228.

Patented August 23, 1904.

UNITED STATES PATENT OFFICE.

DANIEL HURST AND FRANK HURST, OF LONDON, ENGLAND.

JOINT FOR TUBING OR PIPES.

SPECIFICATION forming part of Letters Patent No. 768,228, dated August 23, 1904.

Application filed December 15, 1903. Serial No. 185,265. (No model.)

*To all whom it may concern:*

Be it known that we, DANIEL HURST and FRANK HURST, subjects of the King of Great Britain, residing at London, England, have invented certain new and useful Improvements in Joints for Tubing or Pipes; and we do hereby declare the following to be a full, clear, and exact description of the invention, such as will enable others skilled in the art to which it appertains to make and use the same.

This invention relates to improvements in that kind of tube or pipe joint for which a British patent was granted to Daniel Hurst, dated the 9th day of January, 1901, No. 568; and it consists of certain devices for facilitating the opening and closing of the joint.

In the joints described in the specification of the aforesaid patent the two parts of each joint are connected together by a kind of screw union, which is in some cases inconvenient to manipulate, especially when, as often happens, the screw-threads of the union become damaged by the rough wear and tear of use, so as to prevent the joint being used at all until the thread is repaired. Now according to our present invention we dispense with the screw union altogether and in place thereof employ the arrangements illustrated in the accompanying two sheets of drawings, in which—

Figure 3:
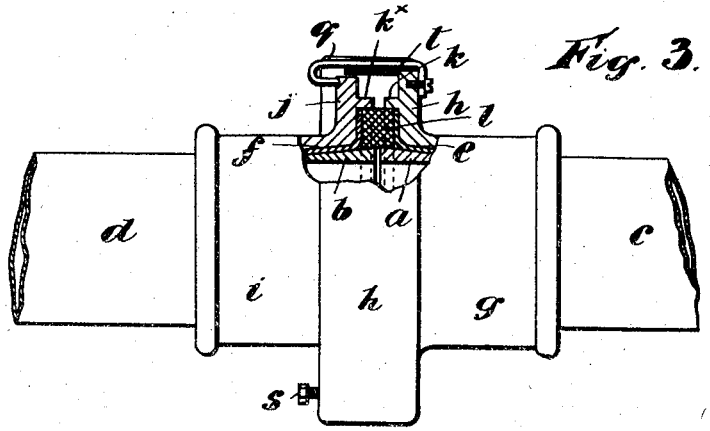
Figure 1:
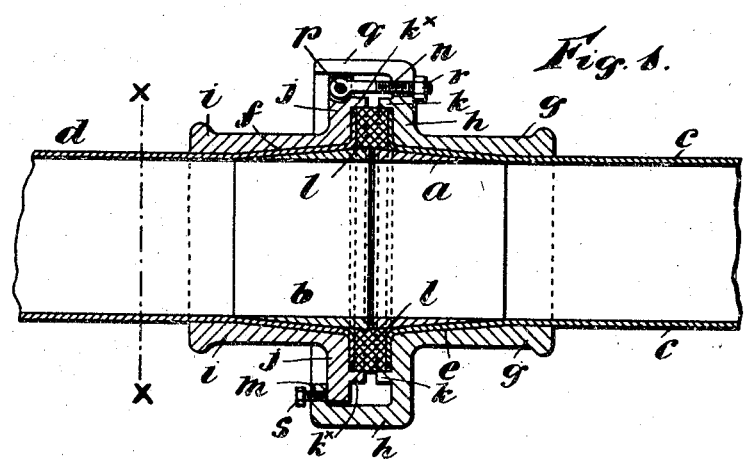
Figure 2:
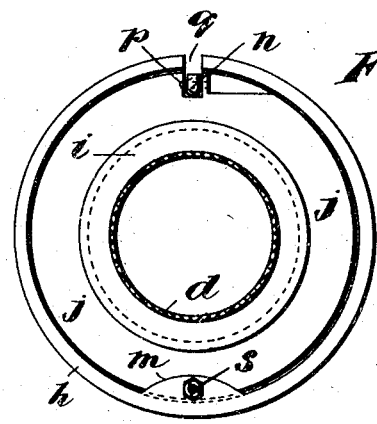

Figure 1 is a longitudinal section of a joint constructed in accordance with our invention and adapted for connecting together the ends of hose-pipe, for example. Fig. 2 is a sectional end view of the same, taken on line X X of Fig. 1. Fig. 3 is an elevation corresponding to Fig. 1, but showing in section a modification of the locking arrangement. Figs. 4 and 4ª are longitudinal sections of modified forms and arrangements of the devices forming the joint; Fig. 5, a sectional end view taken on the line Y Y, Fig. 4; and Fig. 6 is an elevation corresponding to Fig. 4.

Similar letters of reference relate to like parts in all the figures of the drawings.

We prefer to retain the truncated conical internal ferrules described in the specification of the aforesaid patent and place them in the ends of the tube or pipe to be joined together, so that the said ends are flared out in the manner therein shown.

In the drawings accompanying this specification, $a\ b$ represent the said truncated conical ferrules; $c\ d$, the corresponding ends of the hose or other tube or pipe to be connected together, and $e\ f$ the flared-out ends of same. Instead, however, of passing over the outside of these flared-out ends $e\ f$ of the tubes or pipes the two screwed hollow sleeves forming a screwed union, as shown and described in the specification of the aforesaid patent, we pass onto one of the said ends—$e$, for example—a hollow sleeve $g$, provided with a socket $h$, and onto the other, $f$, of the said ends a hollow sleeve $i$, provided with a flange or other suitable projecting part or parts $j$, adapted to enter the socket $h$ on the end of the sleeve $g$. From the bottom of the before-mentioned socket $h$ projects a fillet $k$, concentric with and parallel to but at some little distance from the general line of tube or pipe, and from the flange $j$ projects a similar and corresponding fillet $k^\times$. In the annular space between these fillets and the ferrules $a$ and $b$ inside the pipe ends (which ferrules may be left projecting somewhat beyond the ends of the tubes or pipes, as seen clearly in Fig. 1) we place one or more india-rubber or other elastic packing-washers $l$. On the rim of the aforesaid socket $h$ on one tube or pipe end is formed a snug $m$, behind which the flange $j$ on the other tube or pipe end can be placed, as shown in Fig. 1, and diametrically opposite to the snug $m$ is provided a screwed bolt $n$, hinged at $p$ to the flange $j$ and taking into a notch $q$ in the socket $h$, so as not to project beyond the periphery of the latter when closed into the position shown in Fig. 1. By means of this screwed bolt $n$ the flange $j$ on the one tube or pipe end can be forcibly drawn into the socket $h$ on the other tube or pipe end by screwing up the nut $r$, so as to squeeze the india-rubber or other elastic washer $l$ between them, and so make a tight joint. Pressure may also be applied to the other side of the flange $j$ by means of a set-screw $s$, tapped into the snug $m$ on the socket $h$.

Instead of the hinged screwed bolt $n$, Figs.

1 and 2, we sometimes employ a spring-catch $t$, as shown in Fig. 3. This catch is preferably fixed to the socket $h$ and lies in a notch $q$ in the side thereof, the free end of the catch projecting inward, as shown, so as to take over the edge of the flange $j$ when it is pressed into the socket $h$ far enough to clear the point of the said catch.

In the modification shown in Figs. 4, 5, and 6 spring-catches only are employed to hold the flange $j$ in the socket $h$. In this case the spring-catches $t$ are hinged at $u$ to lugs $v$ formed on the socket $h$, and their points $w$ are constantly pressed radially inward by means of springs $x$. It will be understood that in this case it is only necessary to press the flange $j$ far enough into the socket $h$ to clear the points of the catches $t$, when such points take over the flange and lock it in position. When it is desired to open the joint, it is only necessary to turn the catches $t$ outward into the position shown in dotted lines, Fig. 4, and the flange $j$ can then be drawn out of the socket $h$.

In the modification shown in Figs. 4, 5, and 6 the flange $j$, fillets, and elastic jointing-washer may all be arranged as shown in Fig. 1; but, if preferred, the flange $j$ may have added to it a socket-like part $y$, which takes the place of the fillet $k^\times$ in Fig. 1, but passes in between a fillet $z$ on a flange 1 of the truncated conical ferrule $a$ and the inner wall of the socket $h$, suitable india-rubber or other elastic jointing-washers 2 and 3 being placed, as shown, for the purpose of making a liquid-tight joint between the two tube or pipe ends.

It will be obvious that the screwed bolt $n$ may be hinged to the socket $h$ or other part of the joint instead of to the flange $j$, if preferred, and that the catch or catches $t$ may be fixed or hinged to the flange $j$ or other part of the joint instead of to the socket $h$, if preferred.

By the above-described arrangements the screw-coupling is dispensed with and the coupling and uncoupling is greatly facilitated, while there need be no part protruding laterally from the joint except the socket $h$, and in the arrangement shown in Figs. 4, 5, and 6 the lugs $v$, all of which parts may be made quite smooth externally, and therefore not liable to catch in obstacles, as do the projecting wings or studs of ordinary screw unions.

Our improved joint is specially applicable for jointing together fire-hose or other flexible piping; but it may be employed for coupling together other more or less rigid tubes or pipes.

In some cases the truncated conical ferrules $a$ $b$ may be dispensed with and the hose or other flexible piping $c$ $d$ be wired onto the exterior of the sleeves $g$ $i$, as illustrated, for example, in Fig. $4^a$.

We claim—

1. The improved joint for tubing or pipes which consists of a hollow sleeve $g$ in which is fixed the end of one tube or pipe by means of a truncated conical ferrule $a$, the said sleeve $g$ having a socket $h$; a hollow sleeve $i$ in which is fixed the end of the other tube or pipe by means of a truncated conical ferrule $b$, the said sleeve $i$ having a flange $j$ fitting into the socket $h$; elastic jointing material placed between said flange and the bottom of said socket; and means for securing the parts together, substantially as described with reference to the accompanying drawings.

2. In a joint for tubing or pipes consisting of a hollow socketed sleeve $g$, a flanged sleeve $i$, truncated conical ferrules $a$ and $b$ and elastic joining material, the means for securing the parts together, which consist of one or more catches connected to one part and taking over and locking the other part, substantially as described.

3. In a joint for tubing or pipes consisting of a hollow socketed sleeve $g$, a flanged sleeve $i$, and truncated conical ferrules $a$ and $b$, the combination with the socket $h$ and flange $j$ of fillets on said socket and flange, and elastic jointing material placed between the said fillets and the projecting parts of the said truncated conical ferrules, substantially as described.

4. In a joint for tubing or pipes consisting of a hollow socketed sleeve $g$, a flanged sleeve $i$, and truncated conical ferrules $a$ and $b$, the combination with the flange $j$ and the truncated conical ferrule $a$ of fillets, and elastic jointing material placed between the said fillets and the said truncated conical ferrules, substantially as described.

In witness whereof we have hereunto set our hands in presence of two witnesses.

DANIEL HURST.
FRANK HURST.

Witnesses:
STEPHEN EDWARD GUNYON,
WILLIAM ANDERSON SMITH.